United States Patent
Collins (10) Patent No.: US 7,455,109 B2
(45) Date of Patent: Nov. 25, 2008

(54) WATER FLOODING METHOD

(75) Inventor: Ian Ralph Collins, Sunbury-on-Thames (GB)

(73) Assignee: BP Exploration Operating Company Limited, Middlesex (GB)

(*) Notice: Subject to any disclaimer, the term of this patent is extended or adjusted under 35 U.S.C. 154(b) by 0 days.

(21) Appl. No.: 11/632,994

(22) PCT Filed: Jun. 30, 2005

(86) PCT No.: PCT/GB2005/002555

§ 371 (c)(1), (2), (4) Date: Jan. 22, 2007

(87) PCT Pub. No.: WO2006/008439

PCT Pub. Date: Jan. 26, 2006

(65) Prior Publication Data

US 2007/0246426 A1 Oct. 25, 2007

(30) Foreign Application Priority Data

Jul. 21, 2004 (GB) ................................ 0416310.1

(51) Int. Cl.
*E21B 43/20* (2006.01)
(52) U.S. Cl. .................. 166/275; 166/266; 166/267; 166/310; 166/372
(58) Field of Classification Search .................. None
See application file for complete search history.

(56) References Cited

U.S. PATENT DOCUMENTS 3,171,799 A 3/1965 Batchelder (Continued)

FOREIGN PATENT DOCUMENTS

| GB | 1 520 877 | 8/1978 |
|----|-----------|--------|
| JP | 2004 12303 | 2/2004 |
| WO | WO 02/12675 A1 | 2/2002 |
| WO | WO 2004/106697 A1 | 12/2004 |

OTHER PUBLICATIONS

Eurasian Patent Application 200700200; "Water flooding method"; Translation of the Office Action dated Apr. 22, 2008 (4 pgs.).*

(Continued)

*Primary Examiner*—Zakiya W. Bates
(74) *Attorney, Agent, or Firm*—Nixon & Vanderhye (57) ABSTRACT

A method of recovering hydrocarbons from a porous subterranean hydrocarbon-bearing formation comprising: (a) feeding a first stream comprising a high salinity water to a first side of a semipermeable membrane of at least one forward osmosis unit of a desalination plant and feeding a second stream comprising an aqueous solution of a removable solute to a second side of the semipermeable membrane wherein the solute concentration of the aqueous solution of the removable solute is sufficiently greater than the solute concentration of the high salinity water that water passes through the semipermeable membrane from the high salinity water into the aqueous solution of the removable solute to form a diluted aqueous solution of the removable solute; (b) withdrawing a third stream comprising a concentrated brine and a fourth stream comprising a diluted aqueous solution of the removable solute from the first and second sides respectively of the semipermeable membrane of the forward osmosis unit; (c) substantially separating the removable solute from the fourth stream comprising the diluted aqueous solution of the removable solute to form a low salinity water stream having a total dissolved solids content of less than 5000 ppm; (d) if necessary, increasing the salinity of the low salinity water stream to a total dissolved solids content of at least 200 @@m; (e) introducing the treated low salinity water into the hydrocarbon-bearing formation via an injection well; (f) displacing the hydrocarbons with the treated low salinity water towards an associated production well; and (g) recovering hydrocarbons from the formation via the production well.

25 Claims, 1 Drawing Sheet

U.S. PATENT DOCUMENTS

| | | |
|---|---|---|
| 3,523,582 A | 8/1970 | Fulford |
| 3,617,547 A | 11/1971 | Halff |
| 3,721,621 A | 3/1973 | Hough |
| 4,458,760 A | 7/1984 | Hurd |
| 4,723,603 A | 2/1988 | Plummer |
| 6,391,205 B1 | 5/2002 | McGinnis |

OTHER PUBLICATIONS

Eurasian Patent Application 200700200; "Water flooding method"; Translation of the Office Action dated Sep. 13, 2007 (4 pgs.).*

Morrow, N.R., et al; "Prospects of improved oil recovery related to wettability and brine composition"; *Journal of Petroleum Science and Engineering 20* (1998), 267-276.*

* cited by examiner

Fig.1

WATER FLOODING METHOD

FIELD OF INVENTION

This application is the U.S. National Phase of International Application PCT/GB2005/002555, filed 30 Jun. 2005, which designated the U.S. PCT/GB2005/1002555 claims priority to British Application No. 0416310.1 filed 21 Jul. 2004. The entire content of these applications are incorporated herein by reference.

The present invention relates to a method of recovering hydrocarbons from a porous subterranean hydrocarbon-bearing formation by injecting low salinity injection water having a total dissolved solids content of 200 to 5000 ppm into the formation wherein the low salinity injection water has been prepared by forward osmosis desalination of seawater.

BACKGROUND

It has been reported that the salinity of an injection water can have a major impact on the recovery of hydrocarbons during waterfloods, with increased recovery resulting from the use of diluted brines (see, for example, "Labs Spin Out Oilfield Technologies", American Oil & Gas Reporter, Vol 41, No. 7, July 1988, 105-108; "Effect of brine composition on recovery of Moutray crude oil by waterflooding", Journal of Petroleum Science and Engineering 14 (1996), 159-168; and "Prospects of improved oil recovery related to wettability and brine composition", Journal of Petroleum Science and Engineering 20 (1998) 267-276.

An established desalination method is known as "reverse osmosis" which in reality is a method of "ultra-filtration" through a membrane having minute micropores by applying a pressure differential on the seawater solution and across the membrane. However, problems associated with reverse osmosis include an undesirably low net extracted water product as a result of having to overcome and/or at least more than equal normal forward osmotic flow in the opposite direction, and membrane rupture as a result of the extremely high pressures necessary in reverse osmosis in conjunction with the thin and fragile membrane necessary to obtain or approach a near adequate flow rate of extracted water through the membrane.

An alternative desalination method is forward osmosis (also referred to as "direct osmosis"). Forward osmosis involves applying pressure to a first aqueous solution (for example, seawater) to facilitate the forward osmosis of water through an osmotic membrane into a second aqueous solution having a removable solute dissolved therein, to form a diluted solution, wherein the solute concentration of the second solution is greater than the solute concentration of the first solution and wherein the osmotic membrane has a sufficiently small pore size to exclude the solute of the first aqueous solution and the removable solute of the second aqueous solution from passing through the membrane. Thereafter, the removable solute is substantially removed from the dilute solution.

U.S. Pat. No. 3,171,799 relates to demineralizing water using a system in which two bodies of saline water, e.g. seawater, are separated by a semi-permeable membrane. A volatile solute is then added to one of the bodies of water. The addition of the volatile solute causes pure water, i.e. water containing substantially no salts, to migrate through the membrane from the solution which does not contain the volatile solute, thereby diluting the solutes, including the salts, in the latter solution. This dilution is continued until the desired concentration level of non-volatile salt is reached. The volatile solute is then removed. The process is said to function to produce an extremely dilute solution of non-volatile salts which has a sufficiently low concentration thereof to be suitable for drinking, production of steam etc. The concentration of non-volatile salts in a given solution may be decreased by providing a series of osmotic cells which will successively decrease the concentration of non-volatile salts. It is also said that the demineralization may be achieved using a system comprising a semipermeable membrane having on one side thereof a saline solution and on the other side thereof a fresh water solution containing a volatile solute. Suitable volatile solutes are said to include ammonia, sulfur dioxide, methyl acetate and acetonitrile.

U.S. Pat. No. 3,617,547 relates to a process applicable to the desalting of seawater or other salt-bearing water when a solvent in a solution having a solute difficult to separate from the solvent is extracted by passing the solvent through a permeable membrane to a solution comprising the solvent and a solute easily separated from the solvent. The solute (osmotic agent) for the recipient solution is easily separated from the solvent by precipitation leaving a substantially purer solvent product. For example, the osmotic agent may be a solute that is soluble at elevated temperatures and substantially less soluble at lower temperatures so that it precipitates and separates from solution. The membrane is permeable to the solvent and impermeable to the solute that is difficult to separate from the solvent and to osmotic agent. Typically, the solution containing the precipitated osmotic agent is transferred to a filter where the precipitated osmotic agent is separated from the solvent. As an alternative to removing the osmotic agent by precipitation at lower temperature, osmotic agents may be used that can be oxidized or reduced to a less soluble form and then removed by filtering and reconverting to the osmotic agent for reuse. Examples include cupric chloride that has a high solubility at room temperature and a low solubility when it is reduced to form cuprous chloride and ferrous acetate which is very soluble at room temperature but when oxidized it forms ferric basic acetate, which is insoluble.

It is also known that the injection water used in a waterflood should be compatible with the formation water. Thus, underground formation waters can contain resident ions such as barium (e.g. at a level of up to 3000 ppm, for example 50-500 ppm) and usually also calcium (e.g. at a level of up to 30,000 ppm, for example 1000-5000 ppm) both in the form of soluble chlorides, but also in the presence of sulphate ions, so the water is saturated with barium sulphate, and usually also calcium sulphate. This formation water can meet seawater, which can contain precipitate precursor ions such as soluble carbonate (e.g. at 100-5000 ppm) and sulphate (e.g. at 1000-3500 ppm). Mixing the two waters produces an aqueous supersaturated solution of barium sulphate and/or barium carbonate, and/or calcium sulphate and/or calcium carbonate, from which scale comprising these compounds deposits on surfaces. The meeting of the two waters can be in the formation, when seawater containing precipitate precursor ions is injected into the formation through an injection well at a distance from a production well to enhance oil recovery (i.e. a water flood treatment). The scaling may occur in the production well or downstream thereof e.g. in flow lines, or gas/liquid separators (for separating oil/water from gas) or in transportation pipelines leaving the gas/liquid separators. Carbonate scale may particularly form in the gas/liquid separator or downstream thereof, owing to reduction in gas pressure causing soluble calcium bicarbonate to form insoluble calcium carbonate.

U.S. Pat. No. 4,723,603 relates to a process for reducing or preventing plugging in fluid passageways of hydrocarbon-bearing formations and in production wells which is caused by the accumulation of insoluble salt precipitates therein. This objective is achieved by removing most or all of the precursor ions of the insoluble salt precipitates from an injection water at the surface before the water is injected into the formation. Thus, insufficient precursor ions are available to react with ions already present in the formation to form significant amounts of the insoluble salt precipitates. The precursor ions of the insoluble salt precipitates are removed by means of a reverse osmosis membrane. However, as discussed above a disadvantage of reverse osmosis systems is that they have to pressurize large amounts of water in the feed.

It has now been found that significant energy savings may be made by using forward osmosis to obtain a low salinity injection water. It has also been found that the membrane of the forward osmosis desalination plant may be tailored to be ion selective such that the permeate has a reduced concentration of precipitate precursor ions whilst ensuring that the total dissolved solids of the low salinity injection Water is in the desired range of 200 to 5000 ppm, preferably 500 to 5000 ppm. A further advantage of forward osmosis is that the membrane may be used to separate a first aqueous solution that is a high salinity water such as seawater from a second aqueous solution containing a removable solute also in a high salinity water such as seawater so that the second aqueous solution is diluted down to the desired total salinity through the migration of water from the first to the second aqueous solutions through a membrane. Yet a further advantage of using forward osmosis to obtain the low salinity injection water is that a portion of the solute that is employed to drive the forward osmosis process may be retained in the treated low salinity water provided that the total dissolved solids content of the injection water is the in desired range. It is preferred that the solute employed to drive the forward reverse osmosis does not act as a precipitate precursor ion in a "scaling" formation.

SUMMARY OF INVENTION

Thus, according to a first embodiment of the present invention there is provided a method of recovering hydrocarbons from a porous subterranean hydrocarbon-bearing formation comprising the steps of:

(a) feeding a first stream comprising a high salinity water to a first side of a semipermeable membrane of at least one forward osmosis unit of a desalination plant and feeding a second stream comprising an aqueous solution of a removable solute to a second side of the semipermeable membrane wherein the solute concentration of the aqueous solution of the removable solute is sufficiently greater than the solute concentration of the high salinity water that water passes through the semipermeable membrane from the high salinity water into the aqueous solution of the removable solute to form a diluted aqueous solution of the removable solute;

(b) withdrawing a third stream comprising a concentrated brine and a fourth stream comprising a diluted aqueous solution of the removable solute from the first and second sides respectively of the semipermeable membrane of the forward osmosis unit;

(c) substantially separating the removable solute from the fourth stream comprising the diluted aqueous solution of the removable solute to form a low salinity water stream having a total dissolved solids content of less than 5000 ppm;

(d) if necessary, increasing the salinity of the low salinity water stream to a total dissolved solids content of at least 200 ppm, preferably at least 500 ppm;

(e) introducing the treated low salinity water into the hydrocarbon-bearing formation via an injection well;

(f) displacing the hydrocarbons with the treated low salinity water towards an associated production well; and (g) recovering hydrocarbons from the formation via the production well.

An advantage of forward osmosis is that water has a tendency to diffuse across the semipermeable membrane from the high salinity water into the more concentrated aqueous solution of the removable solute. Thus, unlike a reverse osmosis system, there is no osmotic pressure (often referred to as the "trans-membrane pressure") to be overcome in order to drive water across the membrane. Thus, the forward osmosis unit(s) can be operated at lower pressure than for a reverse osmosis unit thereby reducing the pumping requirements and the risk of rupturing the membrane. A further advantage of the method of the present invention is that there is no requirement to remove the removable solute to the very low contaminant levels required for potable water.

Preferably, the method of the present invention results in an increase in hydrocarbon recovery from the hydrocarbon-bearing formation of at least 5%, preferably of at least 10%, for example, in the range 10 to 20% when compared with a waterflood treatment using the untreated high salinity water.

The semipermeable membrane of the forward osmosis unit(s) should at least be capable of preventing significant amounts of dissolved solids from passing through the membrane whilst allowing water to pass across it thereby diluting the aqueous solution of the removable solute. The semipermeable membrane of the forward osmosis unit(s) should also be capable of preventing the removable solute from passing through the membrane from the aqueous solution of the removable solute into the high salinity water. Suitably, the forward osmosis membrane is an ultrafiltration membrane having a nominal pore size of less than 0.001 μm. Preferably, the membrane of the forward osmosis unit(s) is a flat membrane, a spiral wound membrane or a tubular membrane (including circular, square, rectangular, or triangular cross section) located within a housing. Preferably, the membrane is a spiral wound membrane or a hollow fibre (tubular) membrane.

There are numerous commercially available semipermeable membranes characterized by having small pores so that water molecules may pass freely, while removable solute molecules do not pass through or at least their passage is significantly hindered. Such semipermeable membranes may be organic membranes made of materials such as cellulose acetate, cellulose nitrate, polysulfone, polyvinylidene fluoride, polyamide and acrylonitrile copolymers; mineral membranes or ceramic membranes made of materials such as $\alpha$-$Al_2O_3$, $ZrO_2$, $TiO_2$ or a mixed oxide of $SiO_2$ and $Al_2O_3$ or $ZrO_2$. The membranes may be composites of various materials already mentioned and designed for specific applications.

Preferably, the first stream comprising the high salinity water that is fed to the first side of the semipermeable membrane of the forward osmosis unit(s) (hereinafter "high salinity water feed stream") has a total dissolved solids content (total salinity) of at least 10,000 ppm, more preferably, at least 20,000 ppm, for example, at least 30,000 ppm. Preferably, the high salinity water feed stream is selected from the group consisting of seawater, estuarine water, and produced water (formation water and breakthrough seawater). Preferably, the high salinity water feed stream is filtered prior to being fed to the forward osmosis unit to remove, for example, debris and particulate matter.

Where the high salinity water feed stream comprises seawater, this has a typical composition as given below:

| Component | Concentration (ppm) |
|---|---|
| Chloride | 18,980 |
| Bromide | 65 |
| Sulfate | 2,649 |
| Bicarbonate | 140 |
| Fluoride | 1 |
| Boric acid | 26 |
| Magnesium | 1,272 |
| Calcium | 400 |
| Strontium | 13 |
| Potassium | 380 |
| Sodium | 10,556 |
| Total | 34,482 |

The second stream comprising the aqueous solution of the removable solute that is fed to the second side of the semipermeable membrane (hereinafter "removable solute feed stream") has a greater osmolality than the high salinity water stream that is fed to the first side of the semipermeable membrane. Typically, this may be achieved by ensuring that the total dissolved solute content of the removable solute feed stream is at least 150,000 ppm greater than the total dissolved solute content of the high salinity water stream. Thus, the removable solute functions to promote the migration of water through the semipermeable membrane of the forward osmosis unit(s). Accordingly, water passes (diffuses) through the semipermeable membrane without the application of pressure. However, it is also envisaged that the rate of diffusion of water through the semipermeable membrane may be increased by applying pressure to the first side of the semipermeable membrane. Typically, the high salinity water feed stream should be fed to the first side of the semipermeable membrane of the forward osmosis unit(s) at a pressure in the range 0.5 to 16 bar absolute, preferably, 3 to 10 bar absolute. Preferably, the flux of water through the semipermeable membrane of the forward osmosis unit(s) is in the range 1-100 $1/m^2/h$, preferably 15-40 $1/m^2/h$ (where "flux" is defined as the volume of water passing through 1 $m^2$ of membrane per hour).

The forward osmosis unit(s) is preferably operated in a continuous manner by continuously feeding the high salinity water feed stream and the removable solute feed stream to the first and second sides of the semipermeable membrane respectively and continuously withdrawing the third stream comprising the concentrated brine (hereinafter "waste brine stream") and the fourth stream comprising the diluted aqueous solution of the removable solute (hereinafter "diluted stream") from the first and second sides of the semipermeable membrane respectively. Typically, the high salinity water feed stream and the removable solute feed stream pass in a counter-current direction along the semipermeable membrane such that the high salinity water becomes more concentrated as it passes along the membrane and the aqueous solution of the removable solute becomes more diluted as it passes along the membrane. It is therefore preferred that the removable solute feed stream has a higher osmolality than the concentrated brine stream and the diluted stream has a higher osmolality than the high salinity water feed stream. Accordingly, water continues to pass from the first to the second side of the membrane along the entire length thereof. Suitably, the flow rate of the feed streams along the membrane is at least 0.5 $ms^{-1}$, preferably at least 1 $ms^{-1}$, for example, at least 3 $ms^{-1}$. The amount of treated low salinity water introduced into the hydrocarbon-bearing formation (hereinafter "injection water stream") should satisfy the injection water requirement of the formation and is generally within a range of about 8.5 to 85 $1/m^2$-hr. Typically, the ratio of the low salinity injection water stream to the waste brine stream is in range of from 7:1 to 9:1 and preferably is in the range of from 8:1 to 9:1.

Where a source of fresh water is available for use as solvent for the removable solute feed stream, for example, river water or aquifer water (i.e. water having a low concentration of dissolved solids of less than, for example, 100 ppm, preferably less than 50 ppm), the semipermeable membrane employed in the forward osmosis step is preferably an ultrafiltration membrane having a pore size that substantially excludes the dissolved solids in the high salinity water feed stream from passing through the membrane whilst allowing water to migrate therethrough. Preferably, the membrane also prevents the removable solute from passing therethrough. Accordingly, there are substantially no dissolved solids arising from the high salinity water in the diluted aqueous solution of the removable solute. Thus, when substantially all of the removable solute is removed from the diluted aqueous solution in the separation step, the resulting water stream will have a total dissolved solids content of, for example, less than 100 ppm, preferably, less than 50 ppm. A minor portion of this treated "fresh" water stream (for example, less than 20%, preferably less than 10% by volume) is recycled back to the forward osmosis step as solvent for the removable solute feed stream. The total dissolved solids content of the remainder of the treated fresh water stream may then be adjusted to the desired salinity for the injection water stream by mixing the treated fresh water stream with a portion of the high salinity water feed stream or with a portion of the concentrated waste brine stream. For example, where the high salinity water feed stream has a total dissolved solids content of 30,000 ppm and the treated fresh water stream from the separation step contains substantially no dissolved solids, the high salinity water feed stream and the treated fresh water stream from the separation step may be mixed in a ratio of from 1:60 to 1:6 to generate an injection water stream having a total dissolved solids content in the range 500 to 5000 ppm.

However, it is also envisaged that the semipermeable membrane may be an ion selective membrane that allows a portion of the dissolved solids from the high salinity water feed stream to pass therethrough. The rate at which the high salinity water feed stream and the removable solute feed stream are fed to the forward osmosis unit(s) and the nature of the membrane may be selected so as to achieve the desired total dissolved solids content for the injection water stream of 200 to 5000 ppm, preferably 500 to 5000 ppm (i.e. after separation of the removable solute). However, a disadvantage of this system is that it is not possible to recycle a portion of the injection water stream back to the desalination step as solvent for the aqueous solution of the removable solute. Accordingly, a continuous source of fresh water (river water or aquifer water) is required for the forward osmosis desalination step. Where the method of the present invention is operated offshore and no aquifer water is available, it is envisaged that the desalination plant may comprise a reverse osmosis unit in addition to the forward osmosis unit(s) wherein the reverse osmosis unit provides a continuous source of fresh water to the forward osmosis unit(s). Although this process scheme requires both forward and reverse osmosis units, the reverse osmosis unit will provide only a minor portion of the injection water feed stream, for example, less than 10% by volume so that the reduced pumping duty and hence energy costs of desalination plant are retained. In addition, the reverse osmosis unit may make use of equipment that is common to both the reverse and forward osmosis processes, for example, filters, circulation pumps, cleaning systems etc.

It is preferred that the treated low salinity water is prepared by feeding a high salinity water for example, seawater or produced water to the first side of the semipermeable membrane of the forward osmosis unit(s) and an aqueous solution of the removable solute in a high salinity water to the second side of the semipermeable membrane. The high salinity water that is employed as solvent for the removable solute feed stream may be the same or different to the water of the high salinity water feed stream. In this preferred embodiment of the present invention, the semipermeable membrane is capable of preventing substantially all of the dissolved salts of the high salinity water stream from passing through the membrane. Thus, pure water migrates through the semipermeable membrane from the high salinity water into the aqueous solution of the removable solute in the high salinity water thereby diluting the salts that are naturally occurring in the latter solution. This dilution is continued until the desired concentration level of the naturally occurring salts (200 to 5000 ppm, preferably 500 to 5000 ppm) is achieved. The removable solute is then separated from the diluted solution to give the treated low salinity water.

Preferably, a biocide and/or a scale inhibitor is dosed into the high salinity water feed stream and optionally into the removable solute feed stream. Examples of water soluble biocides include tetrakis(hydroxymethyl)phosphonium sulfate, zinc pyrithione, 1,2-benzisothiazolin-3-one, 2-(thiocyanomethylthio)benzothiazole, 2,2-dibromo-3-nitropropionamide, benzalkonium chloride, benzyl C10-16 alkyldimethyl ammonium chloride, didecyl-dimethyl-ammonium chloride, formaldehyde, glutaraldehyde, N-coco alkyl-1,3,-propylenediamine acetate, sodium hypochlorite, 2-methyl-4-isothiazolin-3-one, and 5-chloro-2-methyl-4-isothiazolin-3-one. The scale inhibitor is added to protect the desalination plant, in particular, the forward osmosis membranes from fouling by deposits of inorganic salt precipitates. Examples of suitable scale inhibitors include water-soluble organic molecules having at least 2 carboxylic and/or phosphonic acid and/or sulphonic acid groups e.g. 2-30 such groups. Preferred scale inhibitors are oligomers or polymers, or may be monomers with at least one hydroxyl group and/or amino nitrogen atom, especially in hydroxycarboxylic acids, hydroxyphosphonic acids, aminophosphonic acids or sulphonic acids. It is also envisaged that the desalination plant may be provided with an electrochlorinator that converts sodium chloride in the high salinity water feed stream into sodium hypochlorite. Suitably, a side stream is taken from the high salinity water feed stream and is passed through the electrochlorinator before being returned to the high salinity water feed stream.

Preferably, the forward osmosis unit(s) of the desalination plant is provided with a cleaning system for removing fouling deposits from the surface of the semipermeable membrane. Thus, the membrane may be backflushed with a portion of the treated low salinity water. For example, a portion of the treated low salinity water may be passed to a tank of the cleaning system. Water from the tank is then periodically backflushed through the forward osmosis membrane before being recycled to the tank. A fine filter located in the cleaning system circuit removes fouling materials from the cleaning water. The water in the cleaning system tank may be periodically emptied and replaced by fresh treated low salinity water. Alternatively, during operation of the cleaning system, a portion of the cleaning water may be continuously discharged to the environment and fresh treated low salinity water may be continuously added to the cleaning water. Preferably, the forward osmosis membrane is backflushed with a dilute sodium hydroxide solution and optionally a dilute sodium bisulfite solution prior to being backflushed with the treated low salinity water.

Preferably, the waste brine stream is discharged from the desalination plant at a distance from the high salinity water feed stream intake to the plant thereby mitigating the risk of the waste brine being recycled to the desalination plant.

Preferably, the removable solute is separated from the third stream comprising the diluted aqueous solution of the removable solute (diluted stream) to give a low salinity injection water stream having a total dissolved solids content of less than 4,000 ppm, more preferably, less than 3,000 ppm. Where the total dissolved solids content of the treated low salinity water, after separation of the removable solute, is below the desired value, the salinity is increased to above 200 ppm, preferably above 500 ppm. For example, the salinity of the treated low salinity water may be adjusted by the addition of a minor amount of the high salinity water feed stream or of the concentrated waste brine stream to the treated low salinity water. Preferably, the total dissolved solids content of the treated low salinity water is in the range 200 to 5000 ppm, preferably 500 to 4,000 ppm, most preferably 1,000 to 3,000 ppm, for example, 1,000 to 2,000 ppm.

The treated low salinity water is preferably passed to a low salinity injection water collection vessel. From the collection vessel, the treated low salinity water ("injection water stream") may be introduced into an injection well via a subsea or surface injection system.

Suitably, the removable solute is a salt that may be rendered insoluble in the diluted aqueous solution of the removable solute (hereinafter "diluted solution") thereby forming a suspension of an insoluble precipitate of the removable solute in an aqueous phase. For example, the removable solute may have a solubility dependent upon the pH value or temperature of the diluted solution. Alternatively, the solubility of the removable solute may be dependent upon its oxidation state.

Where the removable solute is rendered insoluble in the diluted solution, it is preferred to remove the diluted solution from the forward osmosis unit(s) before rendering the removable solute insoluble. Thereafter, the insoluble precipitate is separated from the aqueous phase of the suspension, typically, by filtration or any other convenient conventional method of removing precipitates from a suspension, for example, centrifugation. The separated removable solute may then be reused in the preparation of fresh removable solute feed stream.

Suitably, the removable solute has a solubility dependent upon the pH value of the diluted aqueous solution such that during the forward osmosis step the pH of the diluted solution is substantially retained at a value at which the solute is soluble and thereafter the pH value is adjusted sufficiently that the solute is rendered insoluble. Thus, the removable solute is soluble in at least one of a solution of acid pH value, a solution of neutral pH value, or a solution of basic pH value, and by adjustment of the pH to a higher or lower pH value, as dependent upon the particular removable solute employed, the removable solute thereby becomes insoluble. Preferably the solute is either soluble or insoluble at a pH value near pH 7, so that little or no adjustment of pH value is required for the injection water stream after separation of the precipitate of the removable solute.

Typical solutes that are rendered insoluble by pH adjustment of the diluted solution include those soluble in aqueous acid such as aqueous sulfurous acid or aqueous sulfuric acid, including such removable solutes as, for example, carbonates, oxalates, tartrates, and the like, of metals such as calcium, strontium, barium, nickel, cobalt, copper, mercury, silver, iron sulfide and/or calcium sulfite. For example, calcium sulfite is soluble in sulfurous acid, and iron sulfide is soluble in dilute acids. After removal of the precipitate, the acid is neutralized by typically adding calcium carbonate or hydroxide to a form a precipitate and thereafter removing the precipitate, for example, by filtration.

In another similar embodiment, employing the opposite pH mechanism, a removable soluble salt such as silver sulfate becomes insoluble and the precipitate filterable in an acid pH water solution, by the addition of sufficient acid such as sulphurous acid ($H_2SO_3$) to lower the pH, which after filtration is neutralized by, for example, calcium carbonate and/or calcium hydroxide.

Alternatively, the solute that is rendered insoluble may have a solubility in water dependent upon the temperature of the diluted aqueous solution of the removable solute. Thus, the removable solute may be highly soluble at a given temperature at which water passes through the semipermeable membrane into the aqueous solution of the removable solute and is substantially less soluble at lower temperatures such that the removable solute precipitates from solution. Typically, the solution of the removable solute that is fed to the second side of the semipermeable membrane may be maintained at a temperature of, for example, 60 to 100° C. and after withdrawing the diluted stream from the forward osmosis unit(s), the temperature of the diluted solution may be reduced to, for example, 25° C. to precipitate the removable solute. Suitable solutes that show a marked change in solubility in water with change in temperature include barium hydroxide, calcium salicylate, cesium aluminum sulfate, potassium iodate, potassium permanganate, trisodium phosphate, sodium sulfate, strontium hydroxide, strontium oxalate, sodium tetraborate, potassium nitrate ($KNO_3$) and dodecylamine hydrochloride. Heating and cooling of the solutions may be effected using electrical heaters, refrigeration units, heat exchangers such as steam condensers and so forth, such as are well known in the art, but preferably heat exchangers.

The removable solute that is rendered insoluble may also be a solute that can be oxidized or reduced to a less soluble form and can be removed by filtration or other conventional separation methods and subsequently reconverted to the soluble form of the removable solute for re-use. For example, cupric chloride has a high solubility in water at ambient temperature but when it is reduced electrically or with a chemical reducing agent it forms cuprous chloride that has a very low solubility in water at ambient temperature. The precipitated cuprous chloride may be separated from the diluted solution by, for example, filtration and the cuprous chloride precipitate may be reconverted to cupric chloride for reuse by being oxidized electrically or with some chemical oxidation means, such as bubbling oxygen through a suspension of the cuprous chloride in water. Another example is ferrous acetate, which is very soluble in water at ambient temperature. When it is oxidized electrically or by bubbling oxygen through its solution, it forms ferric basic acetate, which is insoluble. The ferric basic acetate precipitate may be reconverted to ferrous acetate for reuse by being reduced electrically or with some chemical reduction means, such as bubbling hydrogen through a suspension of ferric basic acetate in water.

However, it is preferred that the removable solute is a volatile solute such as ammonia, sulfur dioxide, carbon dioxide, methyl acetate, acrylonitrile and mixtures thereof, particularly, a mixture of ammonia and carbon dioxide. Thus, water passes from the first to the second side of the semipermeable membrane of the forward osmosis unit(s) to form a diluted aqueous solution of the volatile solute. The volatile solute may then be separated from the diluted aqueous solution by any suitable means. For example, the diluted stream that is withdrawn from the second side of the semipermeable membrane is passed to a gas stripper column wherein the diluted stream is passed downwardly through a stripper column counter-current to warm air. Low salinity water, from which the volatile solute had been removed, flows from the bottom of the column and a volatile solvent-air mixture flows from the top. Such a stripping operation may be operated at a temperature of 65 to 90° C. After giving up heat to the water that is used to form the feed stream comprising an aqueous solution of volatile solute (hereinafter "volatile solute feed stream") that is fed to the second side of the semipermeable membrane of the forward osmosis unit(s), the effluent gas from the stripper column may be passed into the bottom of an absorbing column counter-current to the water that is used to form the volatile solute feed stream. Additional volatile solute may be supplied to the bottom of the absorbing column to make up for any loss in the process. Suitably, the concentration of volatile solute in the volatile solute feed stream is in the range 3 to 10% by weight, preferably 4 to 7% by weight. An advantage of the method of the present invention is that there is no requirement to reduce the concentration of volatile solvent in the treated low salinity injection water stream to the low levels required for potable water. Thus, the concentration of volatile solute, for example, ammonia, that is present in the injection water stream may be as high as 100 ppm.

The process of the present invention is particularly advantageous where the high salinity water feed stream has a different ionic makeup to the formation water and where precipitation of insoluble mineral salts would otherwise occur in the formation, and/or in the production well and/or downstream thereof. Accordingly, it is envisaged that the membrane that is employed in the forward osmosis step may be an ion selective membrane having a pore size that excludes precipitate precursor ions of insoluble salt precipitates, in particular, divalent anions such as sulfate ions from passing through the membrane into the diluted aqueous solution of the removable solute. The treated injection water may therefore have a total dissolved solids content is in the range 200 to 5000 ppm, preferably 500 to 5000 ppm and a concentration of precipitate precursor ions, such as sulfate, of less than 40 ppm.

Thus, according to a preferred embodiment of the present invention, there is provided a method of recovering hydrocarbons from a porous subterranean hydrocarbon-bearing formation comprising the steps of:

(a) feeding a first stream comprising a high salinity water to a first side of an ion selective membrane of at least one forward osmosis unit of a desalination plant and feeding a second stream comprising an aqueous solution of a removable solute to a second side of the semipermeable membrane wherein the first stream contains precipitate precursor ions in an amount sufficient to form insoluble mineral salt precipitates in the formation if the first stream contacted resident ions in the formation and the ion selective membrane substantially excludes the precipitate precursor ions from passing through the membrane and wherein the solute concentration of the aqueous solution of the removable solute is sufficiently greater than the solute concentration of the high salinity water that water and optionally non-precipitate precursor ions pass through the ion selective membrane into the aqueous solution of the removable solute to form a diluted aqueous solution of the removable solute;

(b) withdrawing a third stream comprising a concentrated brine and a fourth stream comprising a diluted aqueous solution of the removable solute from the first and second sides respectively of the ion selective membrane of the forward osmosis unit(s);

(c) substantially separating the removable solute from the fourth stream comprising the diluted aqueous solution of the removable solute to form a low salinity water stream having a total dissolved solids content of less than 5000 ppm and having a precursor ion concentration substantially less than the concentration of precursor ions in the high salinity water feed stream;

(d) if necessary, increasing the total dissolved solids content of the low salinity water stream to a total dissolved solids content of at least 200 ppm, preferably, at least 500 ppm;

(e) if necessary, further reducing the concentration of precursor ions in the low salinity water stream such that the amount of insoluble mineral salt precipitates that are formed when the low salinity water contacts the resident ions in the formation is insufficient to block the pores of the formation;

(f) injecting the treated low salinity water into the hydrocarbon-bearing formation via an injection well;

(g) displacing the hydrocarbons with the treated low salinity water towards an associated production well; and (h) recovering hydrocarbons from the formation via the production well.

Preferred compositions of the treated low salinity water (injection water stream) for a formation containing resident ions are given below:

| Component | Concentration (ppm) |
|---|---|
| Chloride | 192.6-1733 |
| Bromide | <0.1 |
| Sulfate | <40 |
| Bicarbonate | 2.1-19 |
| Fluoride | <0.1 |
| Boric acid | <0.1 |
| Magnesium | 3-27 |
| Calcium | 0.9-8 |
| Strontium | <0.1 |
| Potassium | 5.4-49 |
| Sodium | 118.5-1066 |
| Total | Less than 3,000 |

Precipitate precursor ions are defined as ions which form insoluble mineral salt precipitates at the conditions of the formation or in the production well when they contact resident ions. Resident ions are defined as naturally or artificially occurring ions already present in the formation. The precipitate precursor ions must be a different ionic species and oppositely charged to the resident ionic species it contacts in the formation.

Specific ions which can be precursor ions of insoluble mineral salt precipitates include $SO_4^{2-}$, $CO_3^{2-}$, $HCO_3^-$, $HS^-$ and mixtures thereof.

Resident ions already present in the formation which have been observed to form insoluble salt precipitates upon contact with the precursor ions include $Ba^{2+}$, $Sr^{2+}$, $Mg^{2+}$, $Ca^{2+}$, $Fe^{2+}$, $Fe^{3+}$, $Al^{3+}$, $Pb^{2+}$, $Zn^{2+}$ and mixtures thereof.

The resident ions may be naturally occurring in the formation water or may be artificially occurring as a result of some prior treatment process. The resident ions need only be present in the formation at a sufficient concentration to form precipitates with the precursor ions at formation or production well conditions when the dispersion is injected into the formation.

The actual precursor ion concentration at which precipitation occurs for a given case is a function of many variables including the concentration of other ions in solution and the in situ conditions of, for example, temperature, pressure and pH. A person skilled in the art can, in many cases, predict precipitation from data collected from a formation and can therefore apply the method of the preferred embodiment of the present invention before significant deposition of precipitates actually occurs. It is also envisaged that the method may be applied as a remedial action after deposition of precipitates is observed in the production well or downstream thereof.

There is no fixed minimum threshold concentration of precursor ions in the injection water above which precipitation and plugging will occur in all cases. However, an untreated injection water (high salinity water feed stream) having a precursor ion concentration above 50 ppm, for example, above 100 ppm can often form precipitates of insoluble mineral salts when contacted with the appropriate resident ion in situ. Thus, the process of the present invention is generally applicable when the untreated injection water (high salinity injection water feed stream) has a precursor ion concentration above 50 ppm, preferably above 100 ppm and most preferably above 500 ppm.

The selectivity of a membrane is a function of the particular properties of the membrane, including the pore size of the membrane or the electrical charge of the membrane. For example, a polyamide membrane is particularly effective for selectively preventing the precursor ion $SO_4^{2-}$ from passing across it. Suitable ion selective membranes for removing $SO_4^{2-}$ from an injection water include polyamide membranes obtainable from Osmonics Inc., Hydronautics, Dow and Torai.

The harmless ions that pass through the ion selective membrane into the treated injection water may even have a beneficial effect in the formation. For example, potential clay stabilizing ions, such as $K^+$, $Na^+$, $Cl^-$, $Br^-$ and $OH^-$, may be passed into the treated injection water product stream and subsequently injected into the formation to beneficially prevent clay swelling or particle migration. However, in order to obtain the benefit of enhanced oil recovery, the total dissolved solids content of the injection water stream should be in the range 200 to 5000 ppm, preferably 500 to 5000 ppm.

Where a continuous source of pure water is available to act as solvent for the second stream comprising the aqueous solution of the removable solute (removable solute feed stream), the ion selective membrane should preferably prevent the precipitate precursor ions from crossing from the first to the second side of the membrane while at the same time allowing water and a portion of the harmless ions to pass across the membrane. However, as discussed above, the total dissolved solids content of the injection water stream should be in the range 200 to 5000 ppm, preferably 500 to 5000 ppm.

Where the first stream is seawater and the second stream is a solution of the removable solute in seawater, it may not be possible to achieve the desired concentration of precursor ions in the injection water stream without further treating the injection water to remove at least a portion of the remaining precursor ions. For example, where the seawater has a total salinity of 30,000 ppm and the concentration of sulfate ions in the seawater is 2,500 ppm and it is desired to produce an injection water stream having a total salinity of 3,000 ppm, the second stream of the aqueous solution of the removable solute in seawater may only be diluted by a factor of 10. Accordingly, the sulfate concentration of the treated water will be about 250 ppm. It is therefore necessary to further reduce the sulfate concentration of the treated low salinity water to a value of less than 40 ppm prior to introducing the injection water stream into a "scaling" formation. This may be achieved, for example, by passing the treated water through a reverse osmosis unit provided with an ion selective nanofiltration membrane that selectively removes sulfate from the treated low salinity water. Alternatively, excess sulfate ions may be removed through the addition of a precipitating counter-ion for sulfate, for example, $Ba^{2+}$. Where the resulting precipitate of barium sulfate is in finely divided form, it may not be necessary to remove the barium sulfate precipitate from the injection water stream. It is also envisaged that finely divided solid barium sulfate maybe added to an injection water stream that contains excess sulfate ions such that any barium sulfate that precipitates in the formation preferentially precipitates onto the finely divided barium sulfate precipitate and therefore does not form pore plugging precipitates in the formation (as described in our co-pending UK patent application, GB 0501980.7, filed Feb. 1, 2005.

It is envisaged that the treated low salinity water, after separation of the removable solute may have a total salinity below that required for the injection water stream, for example, the treated water may have a total dissolved solids content of less than 200 ppm or less than 100 ppm or may even have a total dissolved solids content that meets potable water standards. The total salinity of the treated low salinity water may then be adjusted to the desired value by mixing the treated low salinity water with the high salinity feed stream or with the waste brine stream. Thus, where the removable solute feed stream that is fed to the second side of the membrane employs fresh water as solvent, the treated low salinity water contains substantially no dissolved solids. However, when high salinity water containing sulfate ions is bled back into this treated water to produce an injection water stream of the desired total salinity, the concentration of precipitate precursor ions, such as sulfate, may increase to above a value at which plugging precipitates will form in the formation. Accordingly, it may be necessary to treat the resulting injection water stream to remove, for example, sulfate ions. Thus, after separation of the removable solute and mixing with a high salinity water the injection water stream may be passed to a conventional reverse osmosis nanofiltration unit or a precipitating cation such as $Ba^{2+}$, may be added, as described above. However, it is preferred to remove the precipitate precursor ions from the high salinity water prior to the mixing step, for example, using conventional reverse osmosis nanofiltration or by precipitating the precipitate precursor ions, as a smaller volume of water requires treatment.

It is envisaged that two forward osmosis processes may be operated in parallel wherein the first process employs a Membrane that excludes substantially all dissolved solids from passing therethrough into an aqueous solution of the removable solute in fresh water and the second process employs an ion selective membrane that selectively prevents sulfate ions from passing therethrough into an aqueous solution of the removable solute in seawater. The two aqueous product stream are then mixed in a ratio that will provide the desired total dissolved solids content and the desired low concentration of precipitate precursor ions.

The desalination plant employed in the method of the present invention may be located on land or offshore, for example, on a platform. A disadvantage of a surface located forward osmosis desalination plant is that such plants have a large footprint and when installed on a platform as a retrofit, often require the addition of platform structure. Thus, it is envisaged that the forward osmosis desalination plant may be submerged in a body of water to reduce the space and weight demands of the platform.

Where the forward osmosis plant is submerged in a body of water, it is preferred that the first stream of the high salinity water is seawater or estuarine water. Thus, the body of water in which the forward osmosis plant is submerged is preferably a sea or an estuary. Preferably, the forward osmosis plant is operated using a high salinity water feed stream having a hydrostatic pressure in the range of 0.5 to 16 bar absolute corresponding to a submerged depth of about 5 to 160 metres thereby reducing the pumping requirements of the plant.

Where the high salinity water feed stream is taken at a submerged depth of at least 100 metres, preferably at least 150 metres, this has an advantage in that the water has a significantly lower oxygen content than water taken from at or near the surface thereby reducing or even eliminating the need for deaerating the low salinity water injection water stream.

Preferably, the submerged forward osmosis desalination plant is provided with a collection tank for the low salinity injection water product; ballast for adjusting the depth at which the plant is submerged; a gas supply, preferably an air supply, for purging water from the plant thereby allowing the plant to be recovered to the surface for servicing and/or repair; a submarine electric cable, preferably, an armored submarine electric cable for transmitting electricity that powers the plant; and fibre optic cables for data and video transmission, as described in our co-pending International patent application number PCT/GB2005/001939. Typically, the components of the forward osmosis desalination plant are located within a housing capable of withstanding the external hydrostatic pressure at the submerged depth.

The submerged forward osmosis desalination plant may be tethered to the seabed via a submarine cable or may be tethered or otherwise secured to a floating structure such as a tension leg platform, a floating production storage off-loading unit (FPSO) or a riser. It is also envisaged that the submerged forward osmosis desalination plant may be arranged on an artificial buoyant seabed.

BRIEF DESCRIPTION OF DRAWINGS

The method of the present invention will now be described with reference to the flow diagram illustrated in FIG. 1.

DETAILED DESCRIPTION OF DRAWING

Figure 1:
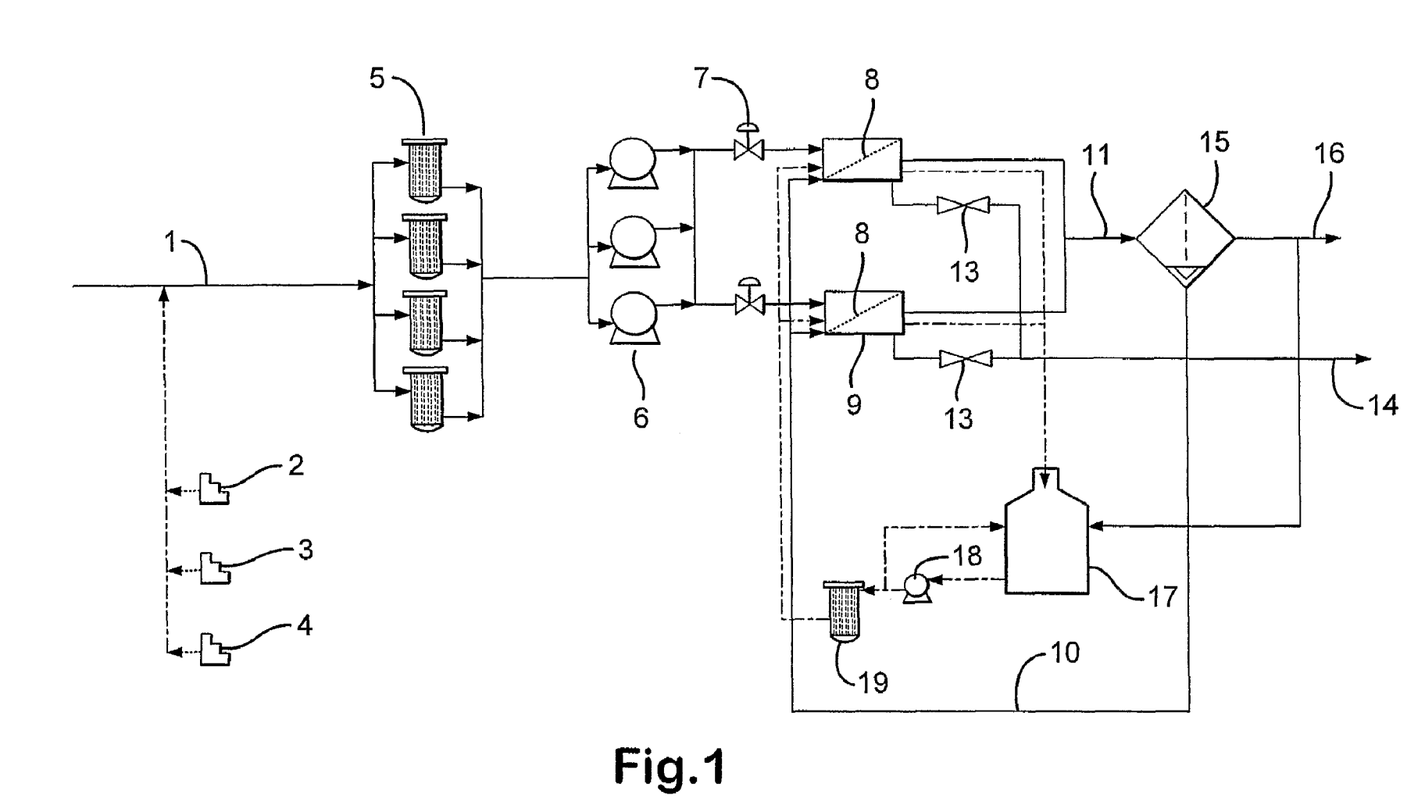

A first feed stream 1 comprising high salinity water is passed through a coarse filter (not shown). A biocide concentrate stream 2, a sodium bisulfite concentrate stream 3 and a scale inhibitor concentrate stream 4 are continuously dosed into the high salinity water feed stream 1 upstream of a plurality of fine filters 5 that are arranged in parallel. The high salinity water feed stream 1 is then passed via at least one low pressure pump 6 and valves 7 to a first side of a membrane 8 of a plurality of forward osmosis units 9 that are arranged in parallel. A second feed stream 10 comprising a solution of a removable solute in a high salinity water is fed to the second side of the membrane 8 of the forward osmosis units 9. A concentrated waste brine stream (retentate) 14 and a stream comprising a diluted aqueous solution of the removable solute (permeate) 11 are removed from the first and second sides of the membrane of the forward osmosis unit respectively. Flow control valves 13 are provided on the outlet for the waste brine stream 14. The waste brine stream 14 is discharged to the environment after removing energy therefrom via a Pelton Wheel, a Dual work energy exchanger, or a pressure exchanger (not shown) that is coupled to the rotors of the low pressure pump(s) 6. The diluted stream 11 is passed to a removable solute separation stage 15 where a low salinity injection water stream 16 is separated from the removable solute. The removable solute is reused in the preparation of fresh second feed stream 10. The low salinity injection water stream 16 is passed to a storage tank (not shown) before being sent to an injection system (not shown). At least a portion of the low salinity water stream 16 is fed to a tank 17 of a cleaning system. Periodically, valves 7 and 13 are closed and the low pressure pump(s) 6 is switched off to allow backflushing of the membranes of the forward osmosis units 9. Low salinity water from tank 17 of the cleaning system is then pumped to the second side of the membranes 8 of the forward osmosis units 9 via pump 18 before being recycled to the tank 17. A fine filter 19 positioned in the cleaning circuit removes any fouling material that is washed from the membranes 8 of the forward osmosis units 9.

The invention claimed is:

1. A method of recovering hydrocarbons from a porous subterranean hydrocarbon-bearing formation comprising the steps of:
   (a) feeding a first stream comprising a high salinity water to a first side of a semipermeable membrane of at least one forward osmosis unit of a desalination plant and feeding a second stream comprising an aqueous solution of a removable solute to a second side of the semipermeable membrane wherein the solute concentration of the aqueous solution of the removable solute is sufficiently greater than the solute concentration of the high salinity water that water passes through the semipermeable membrane from the high salinity water into the aqueous solution of the removable solute to form a diluted aqueous solution of the removable solute;
   (b) withdrawing a third stream comprising a concentrated brine and a fourth stream comprising a diluted aqueous solution of the removable solute from the first and second sides respectively of the semipermeable membrane of the forward osmosis unit;
   (c) substantially separating the removable solute from the fourth stream comprising the diluted aqueous solution of the removable solute to form a low salinity water stream having a total dissolved solids content of less than 5000 ppm;
   (d) if necessary, increasing the salinity of the low salinity water stream to a total dissolved solids content of at least 200 ppm, preferably, at least 500 ppm;
   (e) introducing the treated low salinity water into the hydrocarbon-bearing formation via an injection well;
   (f) displacing the hydrocarbons with the treated low salinity water towards an associated production well; and
   (g) recovering hydrocarbons from the formation via the production well.

2. A method according to claim 1 wherein the first stream that is fed to the first side of the semipermeable membrane of the forward osmosis unit(s) has a total dissolved solids content (total salinity) of at least 20,000 ppm.

3. A method according claim 1 wherein the second stream that is fed to the second side of the semipermeable membrane of the forward osmosis unit(s) has a total dissolved solute concentration that is at least 150,000 ppm greater than the total dissolved solute concentration of the first stream that is fed to the first side of the semipermeable membrane.

4. A method according to claim 1 wherein the treated low salinity water has a total dissolved solids content in the range 500 to 4,000 ppm.

5. A method according to claim 1 wherein the first stream is fed to first side of the semipermeable membrane of the forward osmosis unit(s) at a pressure in the range 0.5 to 16 bar absolute, preferably, 3 to 10 bar absolute.

6. A method according to claim 1 wherein the flux of water through the semipermeable membrane of the forward osmosis unit(s) is in the range 1-100 $1/m^2/h$, preferably 15-40 $1/m^2/h$ (where "flux" is defined as the volume of water passing through 1 $m^2$ of membrane per hour).

7. A method according to claim 1 wherein the forward osmosis unit(s) is operated in a continuous manner by continuously feeding the first and second streams to the first and second sides of the semipermeable membrane respectively and continuously withdrawing the third and fourth streams from the first and second sides of the semipermeable membrane respectively.

8. A method according to claim 7 wherein the first and second streams pass in a counter-current direction along the first and second sides of the semipermeable membrane respectively.

9. A method according to claim 1 wherein the ratio of the treated low salinity water stream to the waste brine stream is in range of from 7:1 to 9:1.

10. A method according to claim 1 wherein injection of the treated low salinity water into the hydrocarbon-bearing formation results in an increase in hydrocarbon recovery from the hydrocarbon-bearing formation of at least 5% when compared with using the untreated high salinity water.

11. A method according to claim 1 wherein the semipermeable membrane of the forward osmosis unit(s) is an ultrafiltration membrane having a nominal pore size of less than 0.001 μm.

12. A method according to claim 1 wherein the semipermeable membrane of the forward osmosis unit(s) is an ultrafiltration membrane having a pore size that substantially excludes both the dissolved solids in the first stream and the removable solute in the second stream from passing through the membrane whilst allowing water to migrate therethrough to form a diluted aqueous solution of the removable solute and wherein the second stream comprises a solution of the removable solute in fresh water such that after substantially all of the removable solute is separated from the fourth stream, the resulting low salinity water stream has a total dissolved solids content of less than 100 ppm, preferably less than 50 ppm, and wherein the method comprises the additional steps of:
   (i) recycling a minor portion of the low salinity water stream back to the forward osmosis step as fresh solvent for the second stream; and
   (ii) adjusting the total dissolved solids content of the remainder of the low salinity water stream to the desired value for the treated low salinity water (200 to 5000 ppm, preferably 500 to 5000 ppm) by mixing the low salinity water stream with a portion of the high salinity water feed stream or with a portion of the concentrated waste brine stream.

13. A method as claimed claim 12 wherein the fresh water is selected from river water, aquifer water or water produced using a reverse osmosis desalination unit.

14. A method as claimed in claim 1 wherein the second stream comprises a solution of the removable solute in fresh water, the membrane is an ion selective membrane that allows a portion of the dissolved solids from the high salinity water feed stream to pass therethrough and the rates at which the first and second streams are fed to the semipermeable membrane of the forward osmosis unit(s) and the nature of the membrane are selected so that, after separation of the removable solute from the fourth stream, the low salinity water has a total dissolved solids content in the range 200 to 5000 ppm, preferably 500 to 5000 ppm.

15. A method according to claim 1 wherein the second stream comprises a solution of the removable solute in a high salinity water and the semipermeable membrane is capable of preventing substantially all of the dissolved solids contained in the first stream from passing through the membrane whilst allowing water to pass therethrough thereby diluting the dissolved solids that are naturally occurring in the second stream and this dilution is continued until the concentration level of the naturally occurring dissolved solids in the fourth stream is in the range of 200 to 5000 ppm, preferably 500 to 5000 ppm such that separation of the removable solute from the diluted aqueous solution gives the desired low salinity water.

16. A method according to claim 1 wherein the separated removable solute is recycled for use in the preparation of the second stream.

17. A method according to claim 1 wherein a biocide and/or a scale inhibitor is dosed into the first stream and optionally into the second stream that are fed to the first and second sides of the semipermeable membrane respectively.

18. A method according to claim 1 wherein the semipermeable membrane of the forward osmosis unit(s) of the desalination plant is cleaned by periodically backflushing the membrane with a portion of the low salinity water product stream.

19. A method according to claim 1 wherein the removable solute is separated from the diluted aqueous solution of the removable solute (fourth stream) by rendering the removable solute insoluble in the fourth stream thereby forming a suspension of an insoluble precipitate of the removable solute in a low salinity water aqueous phase; and separating the insoluble precipitate from the aqueous phase of the suspension thereby generating the low salinity water stream.

20. A method according to claim 19 wherein the removable solute is selected from the group consisting of salts that are rendered insoluble by (a) adjusting the pH value of the fourth stream (b) adjusting the temperature of the fourth stream or (c) changing the oxidation state of the removable solute.

21. A method according to claim 1 wherein the removable solute is a volatile solute and the volatile solute is separated from the fourth stream (diluted aqueous solution of the volatile solute) by vaporizing the volatile solute thereby generating a vapour phase and a low salinity water aqueous phase and separating the phases.

22. A method according to claim 21 wherein the volatile solute is vaporized by reducing the pressure of the fourth stream or by hot gas stripping.

23. A method according to claim 1 wherein the desalination plant is located on land or offshore on a platform or is submerged in a body of water.

24. A method of recovering hydrocarbons from a porous subterranean hydrocarbon-bearing formation comprising the steps of:
- (a) feeding a first stream comprising a high salinity water to a first side of a semipermeable membrane of at least one forward osmosis unit of a desalination plant and feeding a second stream comprising an aqueous solution of a removable solute to a second side of the semipermeable membrane wherein the first stream contains precipitate precursor ions in an amount sufficient to form insoluble mineral salt precipitates in the formation if the first stream contacted resident ions in the formation and the semipermeable membrane is an ion selective membrane that substantially excludes the precipitate precursor ions from passing through the membrane and wherein the solute concentration of the aqueous solution of the removable solute is sufficiently greater than the solute concentration of the high salinity water so that water and optionally non-precipitate precursor ions pass through the ion selective membrane into the aqueous solution of the removable solute to form a diluted aqueous solution of the removable solute;
- (b) withdrawing a third stream comprising a concentrated brine and a fourth stream comprising a diluted aqueous solution of the removable solute from the first and second sides respectively of the ion selective membrane of the forward osmosis unit(s);
- (c) substantially separating the removable solute from the fourth stream comprising the diluted aqueous solution of the removable solute to form a low salinity water stream having a total dissolved solids content of less than 5000 ppm and having a precursor ion concentration substantially less than the concentration of precursor ions in the high salinity water feed stream;
- (d) if necessary, increasing the total salinity of the low salinity water stream to a total dissolved solids content of at least 200 ppm, preferably, at least 500 ppm;
- (e) if necessary, further reducing the concentration of precursor ions in the low salinity water stream such that the amount of insoluble mineral salt precipitates that are formed when the low salinity water contacts the resident ions in the formation is insufficient to block the pores of the formation;
- (f) injecting the treated low salinity water into the hydrocarbon-bearing formation via an injection well;
- (g) displacing the hydrocarbons with the treated low salinity water towards an associated production well; and
- (h) recovering hydrocarbons from the formation via the production well.

25. A method according to claim 24 wherein the first stream that is fed to the first side of the semipermeable membrane of the forward osmosis unit(s) has a precursor ion concentration of above 500 ppm and the treated low salinity water stream that is injected into the hydrocarbon-bearing formation has a precursor ion concentration of less than 40 ppm.

* * * * *